United States Patent Office 3,142,683
Patented July 28, 1964

3,142,683
1-PYRIDYL-1,2-DIARYL-3-TRIFLUORO-PROPAN-2-OLS AND A PROCESS FOR THEIR PREPARATION
John R. Dice and Martin L. Black, Ann Arbor, Mich., assignors to Parke, Davis & Company, Detroit, Mich., a corporation of Michigan
No Drawing. Filed Aug. 14, 1961, Ser. No. 131,094
6 Claims. (Cl. 260—297)

This invention relates to trifluoropropane derivatives and to methods for their production. In particular, the invention is concerned with novel trifluoropropane compounds of the formula

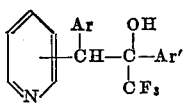

and with anhydro derivatives thereof; where Ar can represent phenyl or chlorophenyl and Ar' can represent phenyl, chlorophenyl or methoxyphenyl.

According to the invention, trifluoropropanol compounds of the foregoing formula are prepared by reacting an α,α,α-trifluoroacetophenone compound of the formula Ar'—COCF$_3$ with an alkali metal derivative of an aralkylpyridine compound of the formula

under anhydrous conditions followed by hydrolysis of the resulting reaction product; where Ar and Ar' are as defined before. The first phase of the process is carried out by reacting the trifluoroacetophenone compound with an alkali metal derivative of the aralkylpyridine compound in a nonhydroxylic solvent such as an ether or a hydrocarbon. The preferred alkali metal derivative is the lithium or sodium derivative. Solvents normally employed are lower aliphatic ethers, benzene, toluene, xylene, tetrahydrofuran or mixtures thereof. If desired, the alkali metal derivative of the aralkylpyridine compound can be formed directly in the reaction mixture and used without isolation. It can be obtained by reacting the aralkylpyridine compound with a reactive alkali metal derivative such as phenyllithium, sodamide, sodium hydride, lithium diisopropylamide or sodium diisopropylamide. The reaction of the trifluoroacetophenone compound with the alkali metal derivative of the aralkylpyridine compound proceeds at a satisfactory rate at room temperature or below and, depending on the solvent, a temperature within the range of about −20° to 140° C. can be used. Preferably the reaction is carried out in a low boiling ether between room temperature and the reflux temperature of the reaction mixture. The desired product is then obtained following hydrolysis of the mixture with water or other aqueous medium. The trifluoropropanol compounds of the invention are produced in stereoisomeric forms and, if the individual diastereoisomers are desired, they are obtained by fractional crystallization of the reaction product.

Also in accordance with the invention, anhydro derivatives, specificially 3,3,3-trifluoro-1-propene compounds of the formula

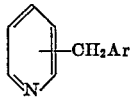

are produced by reacting trifluoropropane compounds of the formula

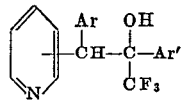

with a dehydrating agent; where Ar and Ar' are as defined before. Suitable dehydrating agents are mixtures of a tertiary amine with an acid halide. The use of a dehydrating agent of this type favors a stereospecific dehydration. Examples of acid halides which can be used are thionyl chloride, acetyl chloride and acetyl bromide. Examples of tertiary amines which can be used are pyridine, triethylamine and dimethylaniline. At least one equivalent and preferably a moderate or large excess of the dehydrating agent is employed. With a mixture of a tertiary amine and an acid halide, the preferred reaction temperature is from 0–50° C. although satisfactory results are also obtained outside of this range. Additional unreactive solvents may also be incorporated in the reaction mixtures. The product is isolated either as an acid addition salt or the free base by pH adjustment.

The 3,3,3-trifluoro-1-propene compounds of the invention exist in stereoisomeric forms which are geometric or cis-trans isomers. In the case of a stereospecific dehydration, a single diasterceoisomeric 3,3,3-trifluoropropan-2-ol compound will yield a single isomeric 3,3,3-trifluoro-1-propene compound whereas in the case of a non-stereospecific dehydration a mixture of isomers, separable by fractional crystallization, is formed.

The compounds of the invention have useful pharmacological and especially hormonal activities. They are potent estrogens and exhibit a high level of activity upon oral administration. They are also hypochloesteremic agents and, along with an estrogenic response, produce a fall in the level of blood cholesterol.

The invention is illustrated by the following examples.

Example 1

A solution of phenyllithium is prepared by adding 2 ml. of bromobenzene to a stirred suspension of 7 g. of finely divided lithium ribbon in a small volume of anhydrous ether, heating to initiate the reaction and adding a solution of 71 g. of bromobenzene in 1000 ml. of ether at a rate sufficient to maintain the reaction mixture under rapid reflux. Striring is continued for one more hour and then 68 g. of 2-benzylpyridine in 200 ml. of ether is added at reflux temperature. A dark red-orange color develops. Stirring and heating at reflux is continued for an additional two hours and then 70 g. of trifluoroacetophenone in 200 ml. of ether is added over a 20 minute period. The reaction mixture is heated under reflux for four hours and allowed to stand overnight at room temperature. Excess lithium is decomposed by slowly adding 500 ml. of water. The product which separates is collected on a filter and dried to give a first crop consisting of 72 g. of a white solid, M.P. 160–164° C. A second crop (32 g.), M.P. 153–155° C., and a third crop (7.5 g.), M.P. 150–152° C. are obtained by successive concentrations of the filtrate. Further recrystallization of the first crop from ethanol-ethyl acetate yields 1 - (2-pyridyl)-1,2-diphenyl-3,3,3-trifluoropropan-2-ol, stereoisomer melting at 190–190.5° C. Further recrystallization of the second crop from ethanol-ethyl acetate yields the lower melting diastereoisomer of 1-(2-pyridyl)-1,2-diphenyl-3,3,3-trifluoropropan-2-ol; M.P. 159–160° C.

Example 2

A solution of 15.2 g. of 2-benzylpyridine in 50 ml. of ether is added to a stirred, refluxing solution of 11 g. of phenyllitihum in 300 ml. of ether. Heating and stirring are continued for an additional two hours and then 18 g. of o-chlorotrifluoroacetophenone in 50 ml. of ether is gradually added. The mixture is heated under reflux for an additional four hours and any excess lithium which may be present is removed by filtration through a cotton plug. The filtrate is stirred with ice-water and the ether phase is then separated and combined with an ether extract of the aqueous phase. The combined ether extract is dried over magnesium sulfate and evaporated in vacuo to yield 1-(2-pyridyl)-1-phenyl-2-(o-chlorophenyl)-3,3,3,-trifluoropropan-2-ol; M.P. 157–158° C. after three crystallizations from ethanol-ethyl acetate.

The starting material is prepared as follows. 108 g. of trifluoroacetonitrile is added to an ether solution of o-chlorophenylmagnesium bromide (prepared from 100 g. of o-chlorobromobenzene in ether at 0° C.). The mixture is stirred at 0–5° C. for three hours and stirred at −20° C. overnight. With caution, 300 ml. of 20% sulfuric acid is added and the phases are separated. The ether phase is dried over magnesium sulfate, evaporated in vacuo and distilled to yield o-chlorotrifluoroacetophenone; B.P. 77–80° C./20 mm.

*Example 3*

A solution of 20.3 g. of 2-benzylpyridine in 50 ml. of ether is added to a stirred, refluxing solution of 14.3 g. of phenyllithium in 350 ml. of ether. Heating and stirring are continued for an additional two hours and then 22.5 g. of p-methoxytrifluoroacetophenone in 75 ml. of ether is gradually added. The mixture is heated under reflux for an additional four hours, filtered from any lithium which may be present, and the filtrate stirred with ice-water. The ether phase is separated, dried and evaporated in vacuo to give 1-(2-pyridyl)-1-phenyl-2-(p-methoxyphenyl) - 3,3,3 - trifluoropropan - 2 - ol as a dark brown oil which crystallizes in heptane. The product is recrystallized from ethanol and then fractionally crystallized from benzene-heptane to give the individual diastereoisomers; M.P. 113–115° C. and M.P. 152–153° C.

*Example 4*

A solution of 65 g. of 2-(p-chlorobenzyl)pyridine in 200 ml. of ether is added to a stirred, refluxing solution of 30 g. of phenyllithium in 800 ml. of ether. Heating and stirring are continued for an additional two hours and then 56 g. of trifluoroacetophenone in 200 ml. of ether is gradually added. The mixture is heated under reflux for an additional four hours, allowed to stand overnight at room temperature and then hydrolyzed by slowly adding 500 ml. of water. The ether phase is separated and combined with additional ether extracts. The combined ether solution is dried and evaporated in vacuo to yield crude 1-(2-pyridyl)-1-(p-chlorophenyl)-2-phenyl-3,3,3-trifluoropropan-2-ol; M.P. 174–175° C. after crystallization from ethanol-ethyl acetate.

*Example 5*

A solution of 23.7 g. of 2-benzylpyridine in 75 ml. of ether is added to a stirred, refluxing solution of 16.8 g. of phenyllithium in 450 ml. of ether. Heating and stirring are continued for an additional two hours and then 25 g. of p-chlorotrifluoroacetophenone in 75 ml. of ether is gradually added. The mixture is heated under reflux for an additional four hours, cooled and stirred with ice-water. The ether phase is separated and evaporated to give a dark brown oil which crystallizes in heptane. This product is crude 1-(2-pyridyl)-1-phenyl-2-(p-chlorophenyl)-3,3,3-trifluoropropan-2-ol. For purification it is treated with activated charcoal and crystallized twice from ethanol to give a mixture of diastereoisomeric forms, M.P. 142–143° C. This mixture is separated into the individual isomers by crystallizing three successive crops of crystals from benzeneheptane. Recrystallization of the first crop from benzeneheptane yields the higher melting diastereoismer; M.P. 159–160° C. Recrystallizations of the third crop from ethanol yields the lower melting diastereoismer; M.P. 112–113° C.

*Example 6*

A solution of 13.5 g. of 2-benzylpyridine in 50 ml. of ether is added to a stirred, refluxing solution of 10 g. of phenyllithium in 300 ml. of ether. Heating and stirring are continued for an additional two hours and then 17.5 g. of m-chlorotrifluoroacetophenone in 50 ml. of ether is gradually added. The mixture is heated under reflux for four more hours, cooled and stirred with ice-water. The ether phase is separated, evaporated to an oily residue, and the residue crystallized from heptane. This product is 1-(2-pyridyl)-1-phenyl-2-(m-chlorophenyl)-3,3,3-trifluoropropan-2-ol; M.P. 169–170° C. after two crystallizations from benzene-heptane.

*Example 7*

A solution of 54 g. of 4-benzylpyridine in 200 ml. of ether is added to a stirred, refluxing mixture of 37.5 g. of lithium diisopropylamide in 1000 ml. of ether. Stirring is continued for one more hour and then 28 g. of trifluoroacetophenone in 100 ml. of ether is gradually added. The reaction mixture is heated under reflux for seven hours and then cooled and stirred with ice-water. The ether phase is separated, evaporated, and the non-volatile residue crystallized from ethanol to give 1-(4-pyridyl)-1,2-diphenyl-3,3,3-trifluoropropan-2-ol; M.P. 211–212° C. after further crystallizations from ethanol containing a small amount of ethyl acetate.

*Example 8*

A solution of 35 g. of 3-benzylpyridine in 40 ml. of benzene is added to 25 g. of sodium diisopropylamide in 200 ml. of benzene in a nitrogen atmosphere at 5–15° C. The mixture is stirred for 30 minutes and then 17.5 g. of trifluoroacetophenone in 17 ml. of benzene is added at 20° C. Stirring is continued for one more hour and any unreacted sodium is decomposed by cautiously adding a 1:1 mixture of isopropyl alcohol and benzene followed by water. The mixture is acidified with concentrated hydrochloric acid. An insoluble brown oil is separated and neutralized with sodium hydroxide solution. The aqueous mixture is extracted with several portions of ether and the ether extracts are combined, dried over magnesium sulfate and evaporated to give a residue of crude 1-(3-pyridyl)-1,2-diphenyl-3,3,3-trifluoropropan-2-ol. The product is partially purified by crystallization from a mixture of ethanol and heptane. An additional quantity of product is obtained by concentrating the filtrate and adding methanol. Final recrystallization from methanol gives a more highly purified product; M.P. 223–225° C.

*Example 9*

Over a 40 minute period, 12 ml. of thionyl chloride is added to a stirred solution of 5.8 g. of 1-(2-pyridyl)-1,2-diphenyl - 3,3,3-trifluoropropan-2-ol (isomer melting at 159–160° C.) in 28 ml. of pyridine at 0–5° C. Stirring is continued for three hours at room temperature and then the reaction mixture is diluted with a large volume of anhydrous ether, cooled to 5° C. and cautiously diluted with water to decompose excess thionyl chloride. The solution is made strongly alkaline with 15% sodium hydroxide solution and the ether phase is separated. Additional ether extracts are obtained and the combined ether solution is washed with water, dried over magnesium sulfate and evaporated to give an oily residue. The oil is crystallized from aqueous ethanol to give a small crop of starting material and then subsequent crystalline crops of 1 - (2 - pyridyl)-1,2-diphenyl-3,3,3-trifluoro-1-propene; stereoisomer melting at 89–90° C. after two more crystallizations from ethanol. The other stereoisomer is obtained as follows. Thionyl chloride (12 ml.) is slowly added to a stirred solution of 5.5 g. of 1-(2-pyridyl)-1,2-diphenyl - 3,3,3-trifluoropropan-2-ol (isomer melting at 190–190.5° C.) in 70 ml. of pyridine at 30–35° C. Stirring is continued for three hours and then the mixture is diluted with a large volume of anhydrous ether, cooled and cautiously diluted with water to decompose excess thionyl chloride. The solution is made strongly basic with sodium hydroxide solution and the ether phase is separated and evaporated. The residue is crystallized from ethanol to give a small crop of starting material and then crops of 1-(2-pyridyl)-1,2-diphenyl-3,3,3-trifluoro-1-propene, stereoisomer melting at 110–112.5° C. after purification by recrystallization from ethanol.

By the substitution of 1 - (2-pyridyl)-1-phenyl-2-(o-chlorophenyl)-3,3,3-trifluoropropan-2-ol in the foregoing procedure, the product obtained is 1-(2-pyridyl)-1-phenyl-2-(o-chlorophenyl)-3,3,3-trifluoro-1-propene.

By the substitution of 1-(2-pyridyl)-1-phenyl-2-(p-methoxyphenyl)-3,3,3-trifluoropropan-2-ol in the foregoing procedure, the product obtained is 1-(2-pyridyl)-1-phenyl-2-(p-methoxyphenyl)-3,3,3-trifluoro-1-propene.

By the substitution of 1 - (2 - pyridyl)-1-(p-chlorophenyl)-2-phenyl-3,3,3-trifluoropropan-2-ol in the foregoing procedure, the product obtained is 1-(2-pyridyl)-1-(p-chlorophenyl)-2-phenyl-3,3,3-trifluoro-1-propene.

We claim:

1. Trifluoropropane compounds of the formula

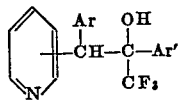

where Ar is a member of the class consisting of phenyl and chlorophenyl, and Ar' is a member of the class consisting of phenyl, chlorophenyl and methoxyphenyl.

2. 1 - (2 - pyridyl) - 1,2-diphenyl-3,3,3-trifluoropropan-2-ol.

3. 1 - (2 - pyridyl)-1-phenyl-2-(o-chlorophenyl)-3,3,3-trifluoropropan-2-ol.

4. Process for the production of a compound of the formula

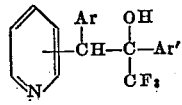

which comprises reacting an $\alpha,\alpha,\alpha$-trifluoroacetophenone compound of the formula $$Ar'—COCF_3$$

with an alkali metal derivative of an aralkylpyridine compound of the formula

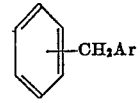

under anhydrous conditions and hydrolyzing the resulting reaction product; where Ar is a member of the class consisting of phenyl and chlorophenyl and Ar' is a member of the class consisting of phenyl, chlorophenyl and methoxyphenyl.

5. Process for the production of 1-(2-pyridyl)-1,2-diphenyl-3,3,3-trifluoropropan-2-ol which comprises reacting $\alpha,\alpha,\alpha$-trifluoroacetophenone with an alkali metal derivative of 2-benzylpyridine under anhydrous conditions and hydrolyzing the reaction product.

6. Process for the production of 1-(2-pyridyl)-1,2-diphenyl-3,3,3-trifluoropropan-2-ol which comprises reacting $\alpha,\alpha,\alpha$-trifluoroacetophenone with the lithium derivative of 2-benzylpyridine under anhydrous conditions and hydrolyzing the reaction product.

References Cited in the file of this patent

UNITED STATES PATENTS

| | | |
|---|---|---|
| 2,727,899 | Bernstein | Dec. 20, 1951 |
| 2,749,351 | Mathes et al. | June 5, 1956 |
| 2,863,802 | Pyne | Dec. 9, 1958 |
| 2,909,525 | Fand | Oct. 20, 1959 |
| 2,961,443 | Ashby et al. | Nov. 22, 1960 |